Dec. 26, 1939.  W. F. GROENE  2,184,591
ORBITAL LATHE
Filed Nov. 2, 1938   9 Sheets-Sheet 1
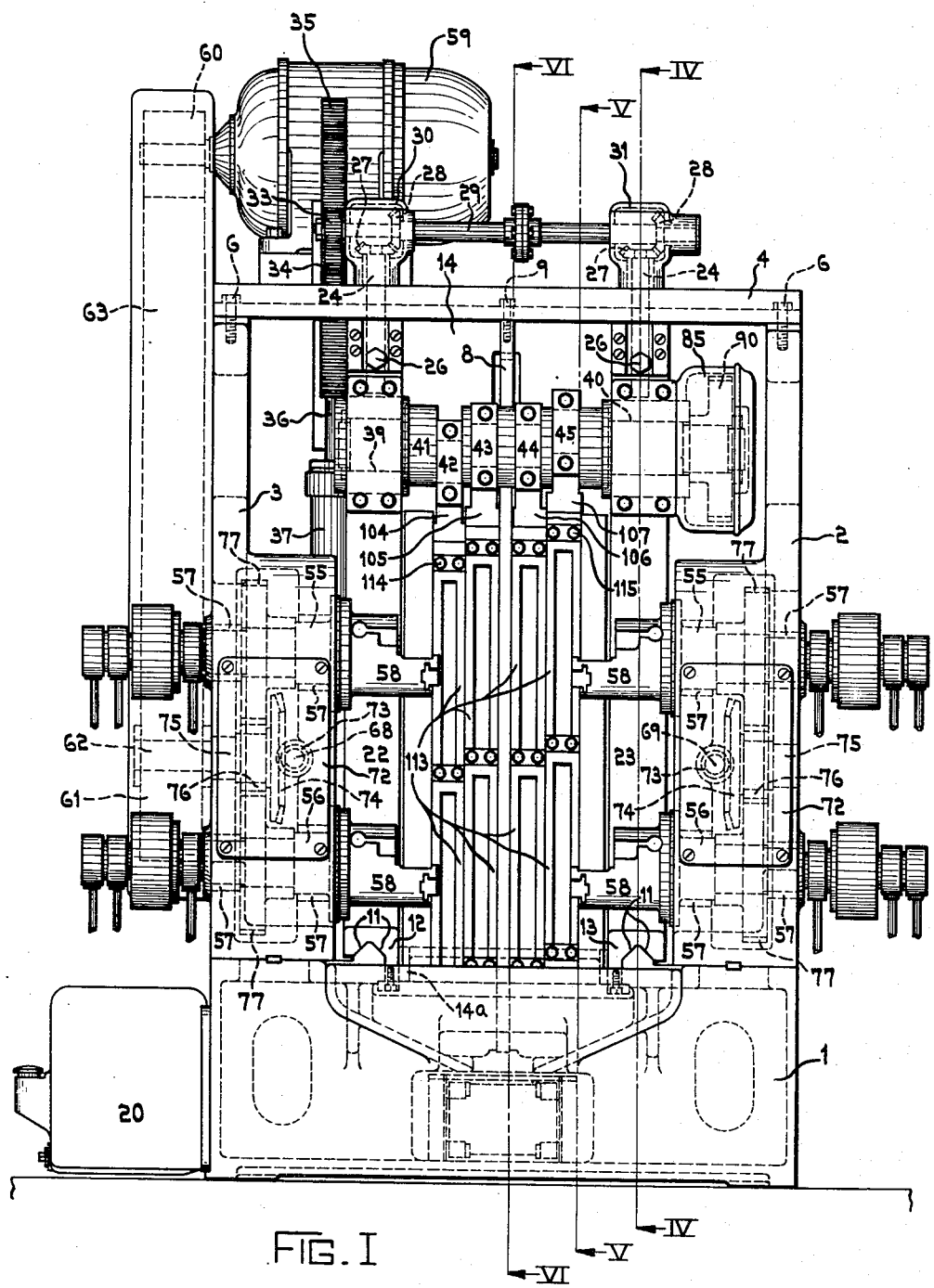
FIG. I
WITNESS:
Orlando S. Knox
INVENTOR.
WILLIAM F. GROENE
BY Willard S. Groene
ATTORNEY.

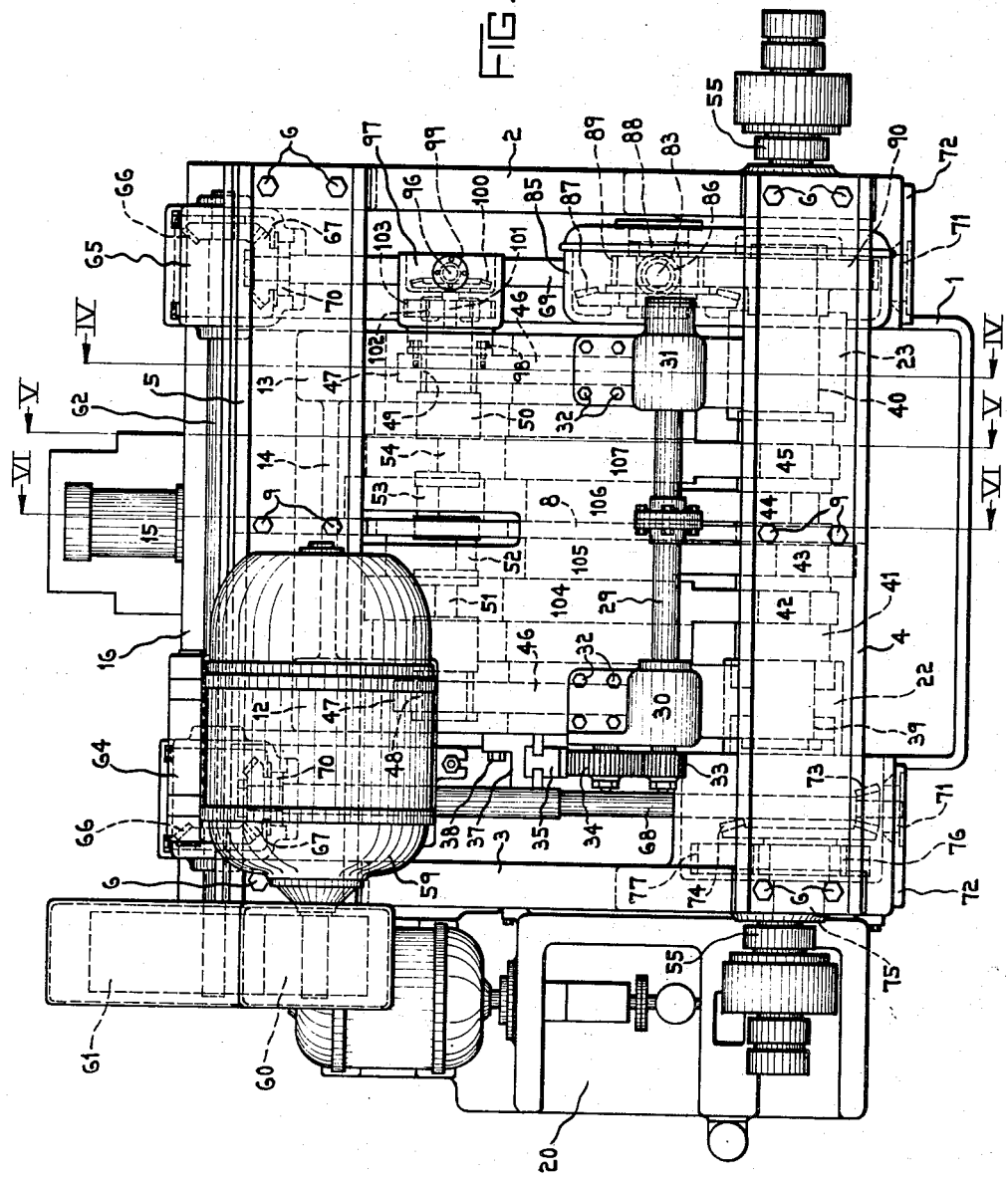

Dec. 26, 1939.  W. F. GROENE  2,184,591
ORBITAL LATHE
Filed Nov. 2, 1938  9 Sheets-Sheet 3
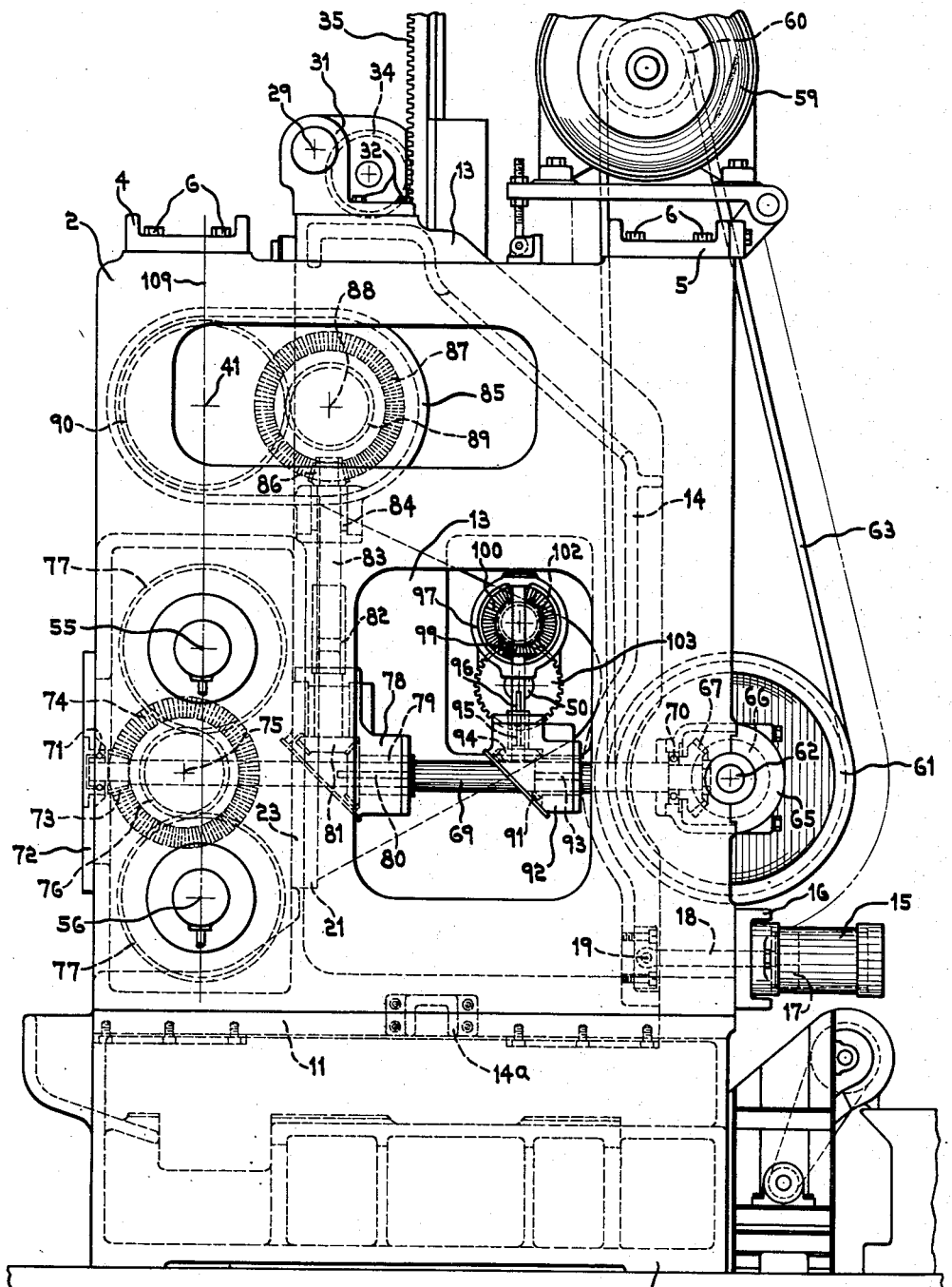
FIG. III
WITNESS:
Orlando L. Knox
INVENTOR.
WILLIAM F. GROENE
BY Willard S. Groene
ATTORNEY.

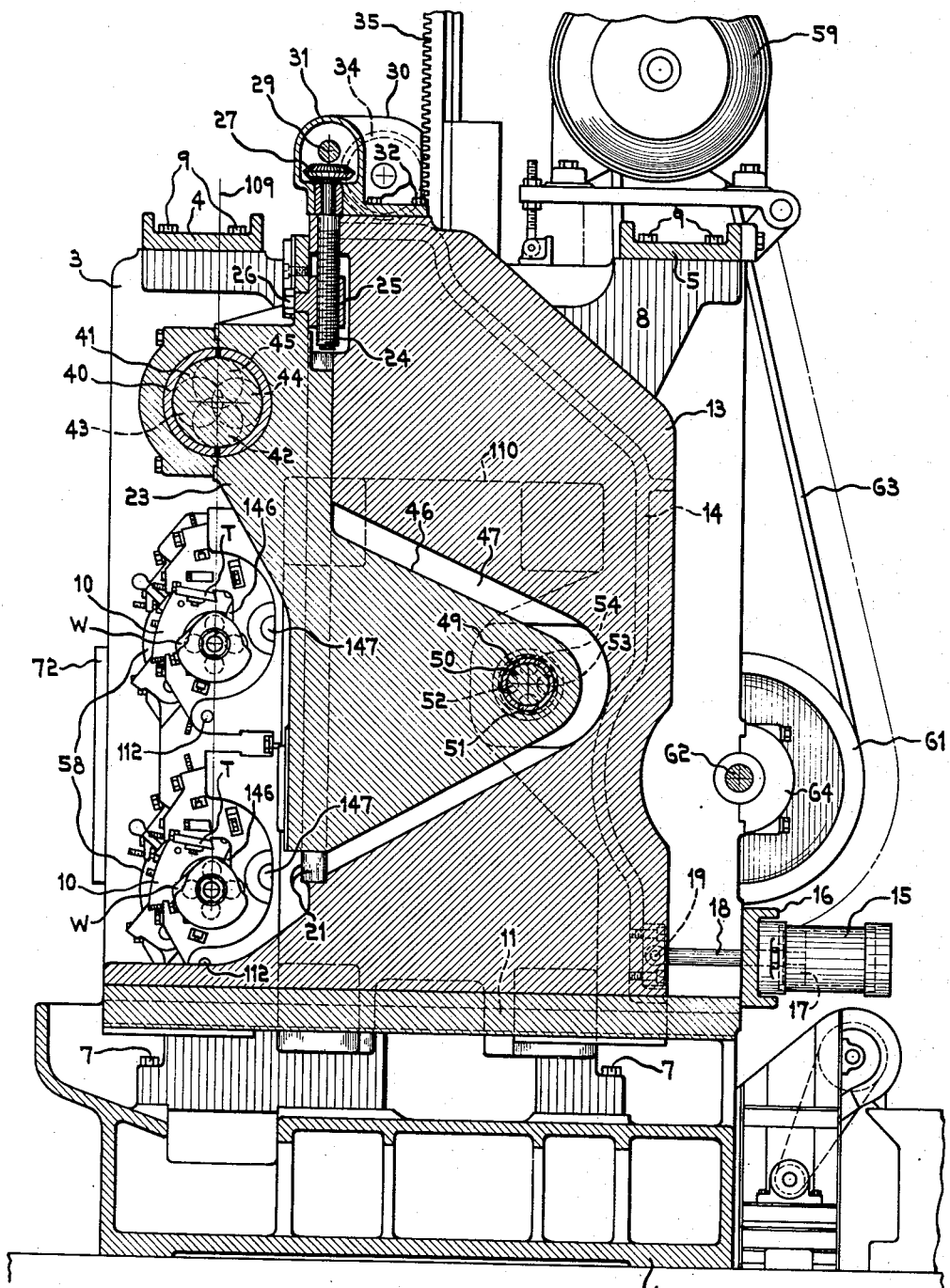
FIG. IV

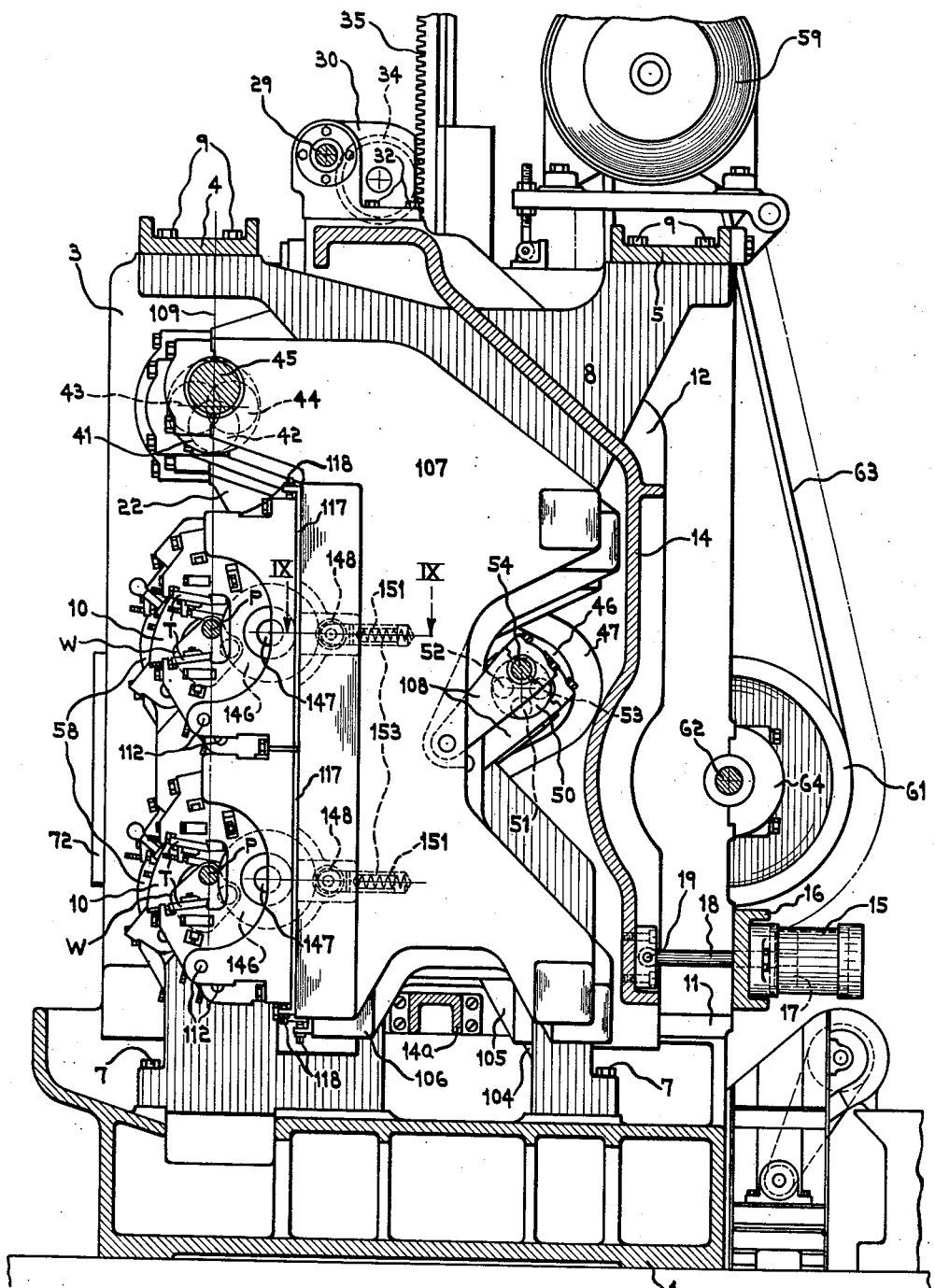

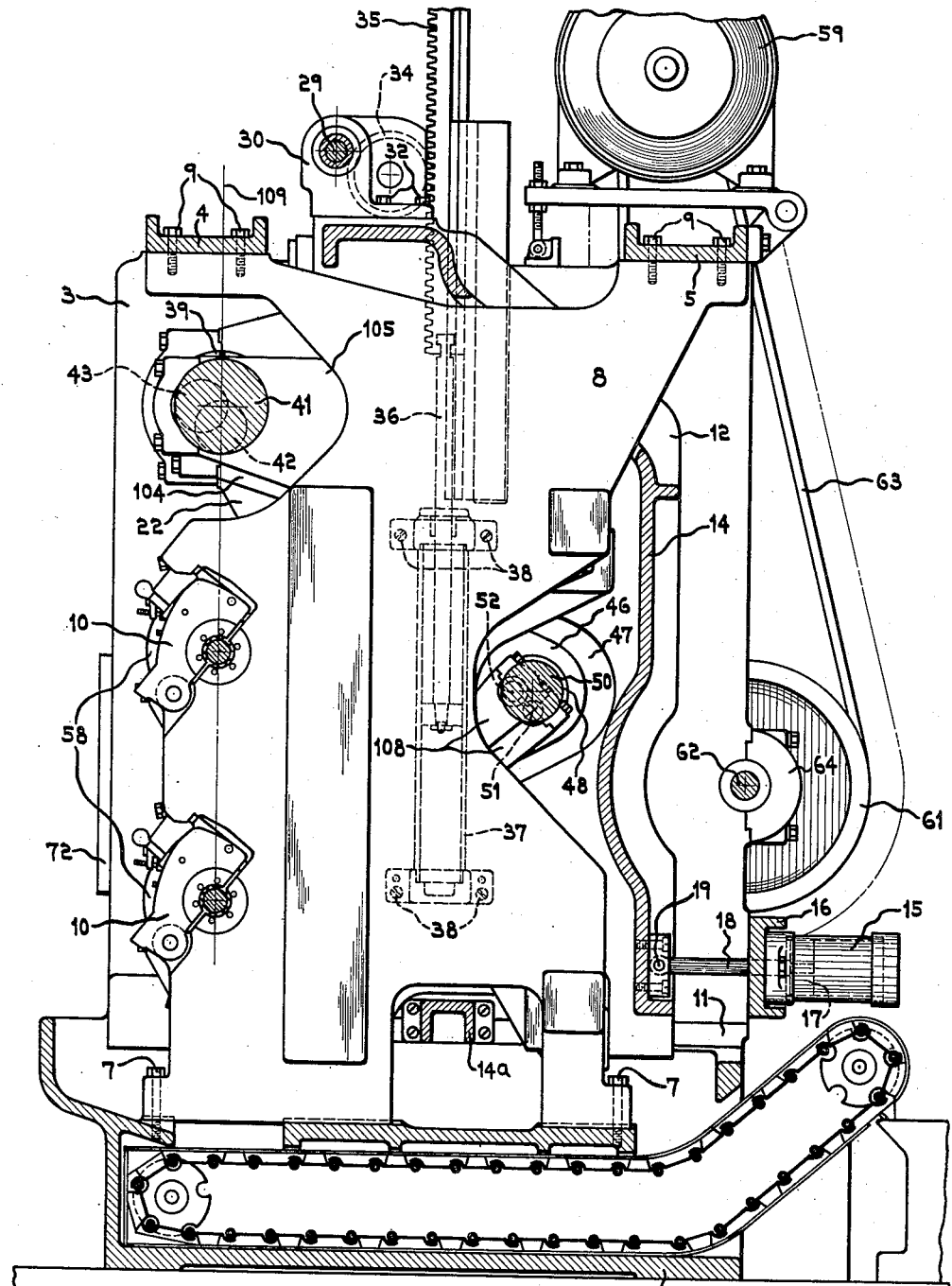
FIG. VI
INVENTOR.
WILLIAM F. GROENE

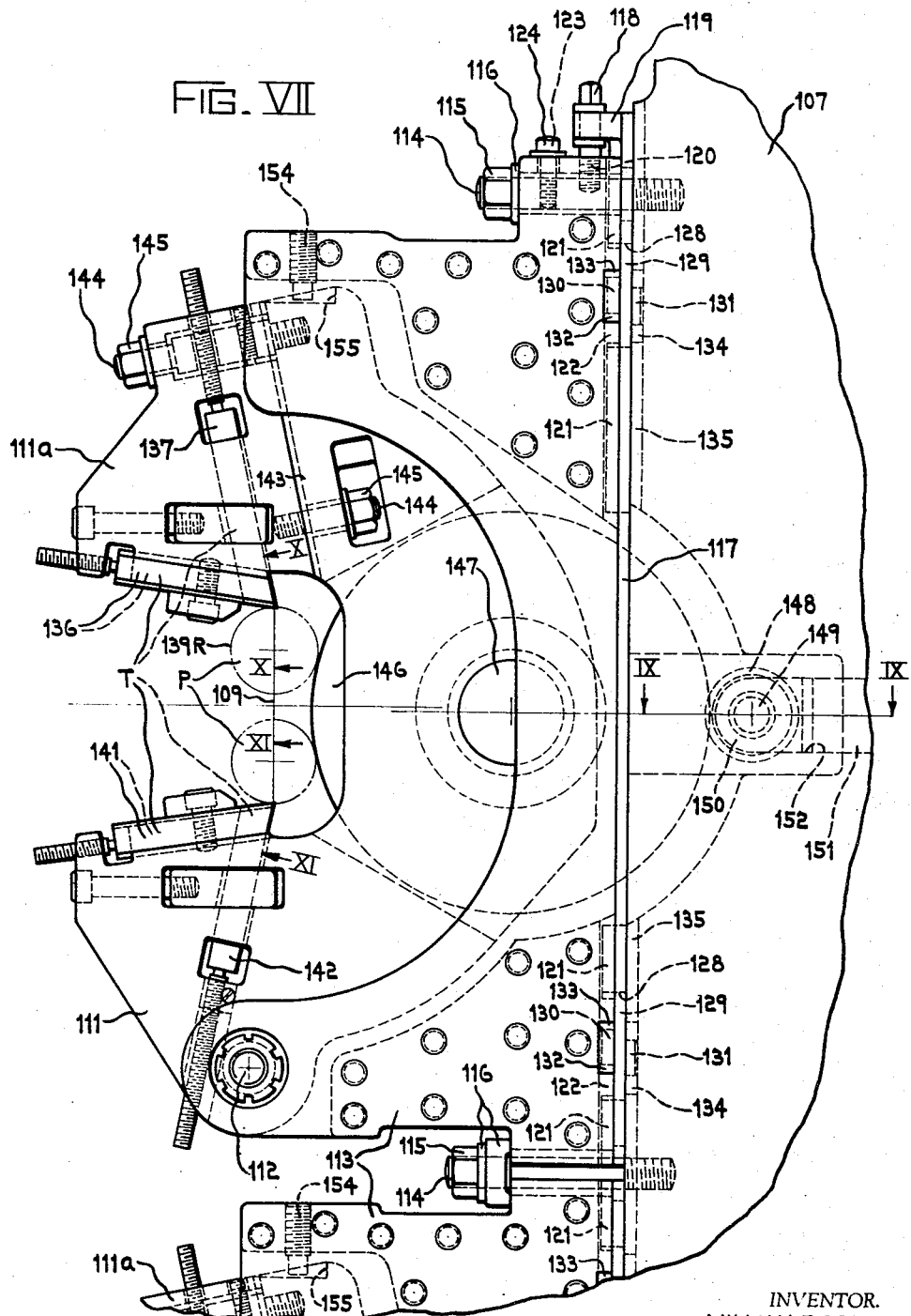

Dec. 26, 1939.  W. F. GROENE  2,184,591
ORBITAL LATHE
Filed Nov. 2, 1938  9 Sheets-Sheet 8
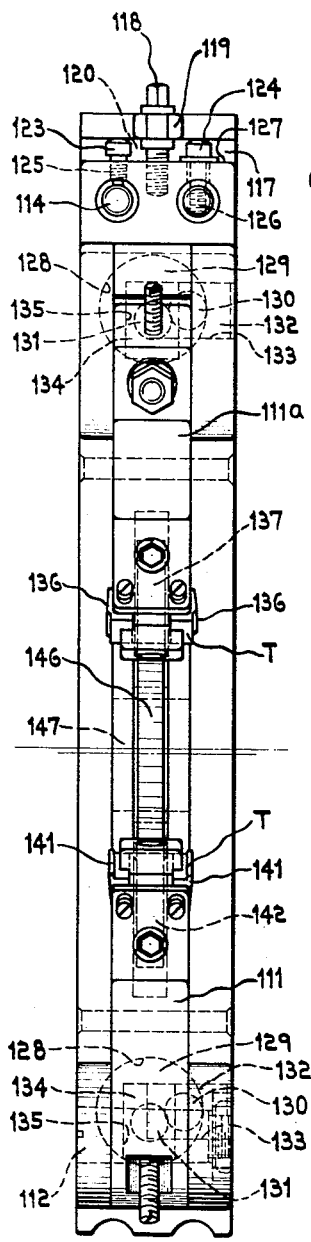
FIG. VIII
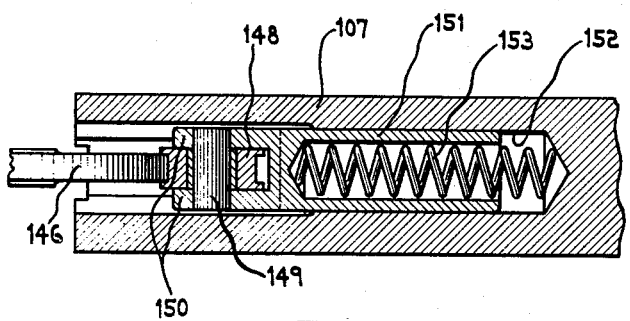
FIG. IX
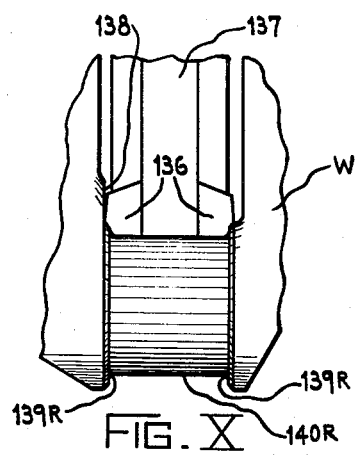
FIG. X
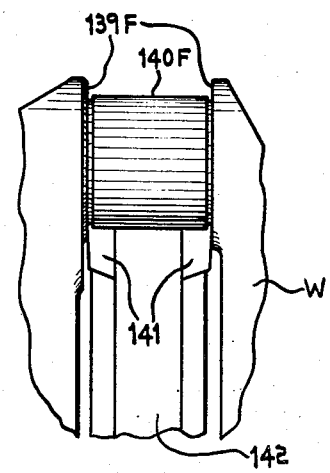
FIG. XI
WITNESS:
Orlando S. Knox
INVENTOR.
WILLIAM F. GROENE
BY Willard S. Groene
ATTORNEY.

Dec. 26, 1939.    W. F. GROENE    2,184,591
ORBITAL LATHE
Filed Nov. 2, 1938    9 Sheets-Sheet 9
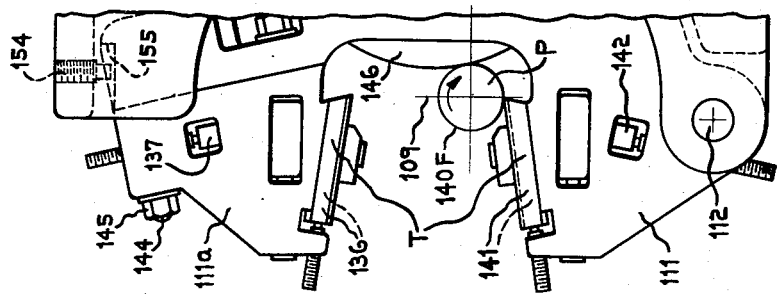
FIG. XV
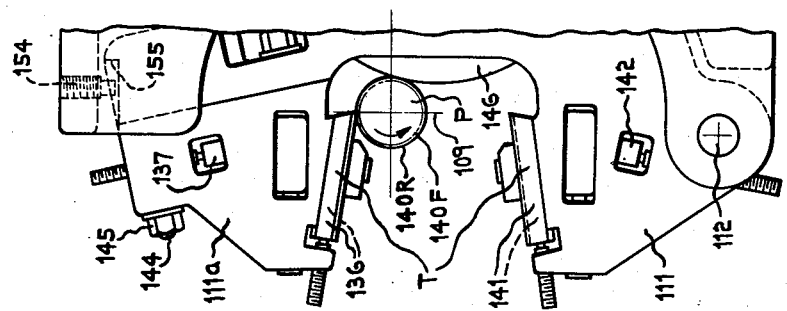
FIG. XIV
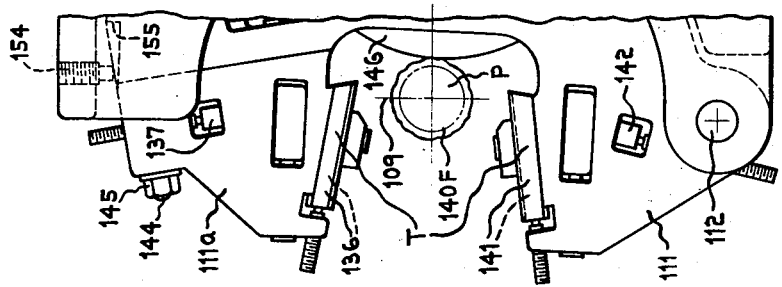
FIG. XIII
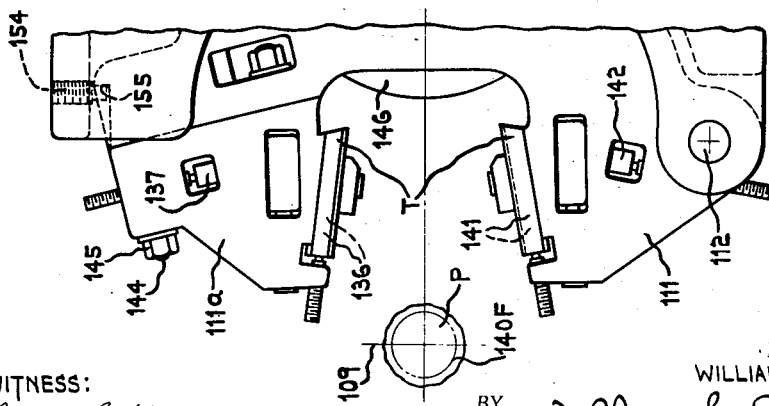
FIG. XII
WITNESS:
Orlando S. Knox
INVENTOR.
WILLIAM F. GROENE
BY Willard S. Groene
ATTORNEY.

Patented Dec. 26, 1939

2,184,591

UNITED STATES PATENT OFFICE 2,184,591

ORBITAL LATHE

William F. Groene, Cincinnati, Ohio, assignor to
The R. K. Le Blond Machine Tool Company,
Cincinnati, Ohio, a corporation of Delaware Application November 2, 1938, Serial No. 238,431

31 Claims. (Cl. 82—9)

This invention pertains to lathes, and more particularly to orbital lathes having a plurality of work spindles in which the crank pins of a plurality of crankshafts may be simultaneously turned. This invention is related to arrangements of a character shown in Patent 2,089,421 dated August 10, 1937 and involves certain improvements and additions to the constructions set forth in said patent.

In the past the turning of the crank pins of crankshafts have always presented most difficult problems, the most serious of which is the radial displacement of the crank pins from their true positions relative to the line bearings and the other crank pin bearings of the crankshaft during the turning operations. This problem is particularly serious in instances where all of the crank pins are to be turned simultaneously in a single operation. The resulting strain on the crankshaft as a whole as set up by the action of the tools on the variously circumferentially positioned crank pins sets up forces of such complex nature as to defy all possible analysis. As a result it has been practically impossible to produce accurately machined crank pin bearings on crankshafts. Another factor which has greatly added to the above difficulties is that the crankshafts which are to be produced by simultaneous turning of all the crank pin bearings at one time, such as those used in the automotive industry, are relatively light and very limber in proportion to the amount of metal that is to be rapidly removed from the bearings. These crankshafts are easily susceptible to axial displacement when any force of even minor magnitude is exerted on the shaft perpendicular to its axis of rotation.

Orbital lathes used in the past to turn the crank pins of crankshaft fall in two general classes of machines: (a) Orbital lathes utilizing two master crankshafts to effect orbital movement of the tool carrier, and (b) Orbital lathes utilizing one master crank shaft and the work piece to effect orbital movement of the tool carrier. Each of the above types of lathes have certain defects that render them inefficient in producing highly accurate crankshafts as required in present day practices.

In the first type, while the actuation of the orbital tool carrier is accomplished by means of two master crankshafts entirely independently of the work piece, there is no means to absorb the radial feeding and cutting forces exerted on the bearing being turned. This has resulted in displacement of the crank pins from their true positions and in the production of excessive chatter and vibration in the lathe with the resultant inferior accuracy and finish of the work piece.

The second type of lathe is defective in that the relatively fragile work piece must be relied upon to support the tool carrier and to effect the orbital movement thereof during the machining operation. Such an arrangement results in burdening the work piece with the weight of the orbital tool carriers which results in deformation and distortion of the crankshaft with the resultant inaccuracy in the finished work piece. Particularly is this condition bad when relatively large and massive tool carriers are required as in turning a plurality of crankshafts at one time as is necessary in the modern day production of these parts.

With the above defects of former machines clearly in mind a machine having the basic principle of Patent 2,089,421 was conceived which has all of the advantages of each of the above types of machines but which distinctly avoids any of their disadvantages. The chief object of the present invention is to further refine this unique new type of machine and to expand its scope of usefulness and efficiency.

One object of this invention is to provide in a lathe of a character shown in Patent 2,089,421 an arrangement whereby a plurality of crankshafts may have their crank pins simultaneously rough turned and simultaneously finished turned with a single chucking of said crankshafts in the lathe.

Another object is to provide a unique arrangement of the master crankshafts and work spindles in a lathe utilizing the principle set forth in the above patent whereby maximum operating efficiency is obtained from the lathe.

Another object is to provide in a lathe of this character a unique tool holder having both roughing tools and finish tools and which are movable relative to the work piece being machined to allow tangential floating movement of both sets of tools relative to the work surface being machined, said movement of the tool holder being controlled by the work piece being machined.

Further features and advantages of this invention will appear in the detailed description of the drawings in which:

Figure I is a front elevation of a multiple spindle orbital lathe embodying this invention.

Figure II is a plan view of the lathe shown in Figure I.

Figure III is a right hand end elevation of the lathe shown in Figure I particularly showing the drive for the master crankshafts and the work spindles.

Figure IV is a vertical transverse section through the lathe on the line IV—IV of Figures I and II particularly showing the right hand portion of the traversing cradle and the right hand feeding slide mounted thereon.

Figure V is a vertical transverse section through the lathe on the line V—V of Figures I and II particularly showing one of the orbitally moving tool carriers.

Figure VI is a vertical transverse section through the lathe on the line VI—VI of Figures I and II particularly showing the steady rest unit of the lathe.

Figure VII is an enlarged detailed right hand side elevation of one of the tool holders carried by an orbitally moving tool carrier shown in Figure V.

Figure VIII is a front elevation of the tool holder shown in Figure VII.

Figure IX is a sectional view through the tool carrier and tool holder on the line IX—IX of Figure V.

Figure X is a fragmentary view on the line X—X of Figure VII showing the work done on a crank pin of a crankshaft by the roughing tools.

Figure XI is a fragmentary view on the line XI—XI of Figure VII showing the work done on a crank pin of a crankshaft by the finishing tools.

Figure XII is a fragmentary view of a portion of the tool holder of Figure VII showing its relation to the crank pin of a crankshaft to be machined when loading or unloading work in the lathe.

Figure XIII shows the position of the tool holder relative to the crank pin of the work crankshaft at the beginning or completion of the machining operations.

Figure XIV shows the position of the tool holder, relative to the crank pin of the work crankshaft at the completion of the rough turning operation.

Figure XV shows the position of the tool holder relative to the crank pin of the work crankshaft at the completion of the finish turning operation.

The lathe comprises a base 1 upon which are fixed the upright housings 2 and 3. These housings are securely connected together at their upper ends by the tie bars 4 and 5 bolted to the housings by suitable bolts 6. Also fixed on the base 1 by suitable screws 7 is the steady rest unit 8 which is secured at its upper ends to the tie bars 4 and 5 by screws 9. This steady rest unit 8 carries steady rests 10 preferably of a character shown in my Patent 2,085,357 dated June 29, 1937.

On the V-guideways 11 formed on the base 1 is slidably mounted the traversing cradle comprising the end housings 12 and 13, which rest directly on the guideways 11, and the connecting web 14 formed integral with said end housings 12 and 13. These end housings 12 and 13 are connected together at the bottom by a tie bar 14a. A fluid pressure cylinder 15 fixed on a tie bar 16 has a piston 17 and a rod 18 appropriately connected at 19 to the web 14 of the traversing cradle whereby proper application of fluid pressure from the hydraulic pressure supply 20 to the cylinder 15 effects reciprocation of the traversing cradle on the guideways 11.

On the front of each of the end housings 12 and 13 are formed guideways 21 upon which may be vertically reciprocated the feeding members 22 and 23. These feeding members 22 and 23 are actuated in exact synchronism by the feed screws 24 operating in appropriate nuts 25 fixed to the feeding members by the bolts 26, the screws being rotated simultaneously by the bevel gears 27 fixed on the screws which are driven by the bevel gears 28 fixed on the feed drive shaft 29 journaled in the gear boxes 30 and 31 mounted on the respective end housings 12 and 13 by the bolts 32. On the left hand end of the shaft 29 is fixed a gear 33 which is driven through the idler gear 34 mounted on the gear box 30, this idler gear being rotated by the rack 35 in mesh therewith and connected to the piston rod 36 of the fluid pressure feeding cylinder 37 mounted on the left hand side of the end housing 12 by suitable screws 38.

Journaled in the bearings 39 and 40 in each of the feeding members 22 and 23 is the upper master crankshaft 41 having the pin bearings 42, 43, 44, and 45 with a stroke and index conforming to that of the work crankshaft W to be machined in the lathe. On each of the feeding members 22 and 23 is formed an integral rearwardly extending projection 46 which is free to move up and down in a suitable cavity 47 provided in the end housings 12 and 13. Journaled in suitable bearings 48 and 49 in the ends of these projections 46 is the rear master crankshaft 50 having the crank pins 51, 52, 53, and 54 having the same stroke and index as the upper master crankshaft 41.

In each of the upright housings 2 and 3 are journaled the upper work spindles 55 and the lower work spindles 56 on suitable bearings 57 and having chucking devices 58 preferably of a character shown in patent 2,030,142, dated February 11, 1936.

The driving mechanism for at all times rotating the work spindles 55 and 56 and the master crankshafts 41 and 50 in synchronism is best shown in Figures I, II, and III. The source of driving power for rotating these parts is derived from the electric motor 59 having a pulley 60 connected to the driven pulley 61 on the shaft 62 by suitable belt 63. The shaft 62 is journaled in gear boxes 64 and 65 fixed on the upright housings 3 and 2 respectively and has the bevel gears 66 fixed thereon which drive the bevel gears 67 fixed on the drive shafts 68 and 69 which are journaled at the rear of the lathe in bearings 70 in the gear boxes 64 and 65 and at the front on the lathe in the bearings 71 carried in the plates 72 bolted to the front face of the housings 2 and 3. Adjacent the bearings 71 are fixed on the shafts 68 and 69 the bevel pinions 73 which drive the bevel gears 74 rotatably mounted on suitable studs 75 fixed in the upright housing 2 and 3. Connected to rotate with these bevel gears 74 are the idler gears 76 which in turn drive the gears 77 fixed on the spindles 55 and 56. The various gearing above described is so proportioned as to cause all of the work spindles to rotate in synchronism.

The upper master crankshaft 41 is driven in synchronism with the work spindles 55 and 56 from the shaft 69. Fixed on the right hand side of the end housing 13 is a gear box 78 having journaled therein against axial movement a bevel gear 79 which slidingly engages and is driven by the splined portion 80 of the shaft 69. This bevel gear 79 in turn drives the vertically journaled bevel gear 81 in the gear box 78. To the upper end of this bevel gear is fixed the splined sleeve 82 in which slidingly fits and is driven the shaft 83 journaled against axial movement in the bearing 84 in the gear box 85 mounted on the feeding member 23. On the upper end of the shaft 83 is fixed the bevel pinion 86 which drives the bevel gear 87 carried on a suitable stud 88 in the gear box 85. The gear 89 connected to rotate with the bevel gear 87 drives the gear 90 fixed on the upper master crankshaft 41 for rotating it in synchronism with the work spindles 55 and 56.

The lower master crankshaft 50 is similarly driven from the shaft 69 by the bevel gear 91 journaled against axial movement in the gear box 92 fixed on the right hand side of the end housing 13 and slidably mounted on and driven by the splined portion 93 of the shaft 69. This bevel gear 91 in turn drives the vertically journaled bevel gear 94 in the gear box 92. The bevel gear 94 is provided with a splined bore 95 in which slidingly fits and is driven the shaft 96 journaled against axial movement in the gear box 97 mounted by screws 98 on the projection 46 of the feeding member 23. On the shaft 96 is fixed the bevel gear 99 which drives the bevel gear 100 carried on a suitable stud 101 fixed in the gear box 97. Connected to rotate with this bevel gear 100 is the gear 102 which drives the gear 103 fixed on the lower master crankshaft 50 to rotate it in synchronism with the work spindles 55 and 56.

The orbitally moving tool carriers 104, 105, 106, and 107 are journaled directly on the crank pins of the upper master crankshaft 41 and by means of a linkage connection 108 of a character shown in Patent 1,744,885 dated January 28, 1930 with the crank pins of the lower master crankshaft 50. A study of Figure V clearly shows the unique arrangement of these tool carriers, the master crankshafts, and the work spindles. It is to be noted that the upper master crankshaft 41 has its axis in the vertical plane 109 defined by the axes of the upper and lower work spindles 55 and 56. By this arrangement the feeding forces of the cutting tools against the work is directly absorbed by this crankshaft. This crankshaft also carries substantially all of the weight of the tool carriers as they operate in orbital movement. Thus no strain is imposed on the work W, as it is being machined, by the weight of the tool carriers as they oscillate up and down in orbital movement. These tool carriers can, therefore, be made very massive, an absolute necessity for turning a plurality of crankshafts at one time, without imposing any strain on the work pieces. The purpose of the lower master crankshaft 50 is to prevent any swinging of the tool carriers on the crank pins of the upper master crankshaft 41 and to thereby maintain exact parallelism of orbital movement of the tool carriers independent of the work pieces W to thereby eliminate any strain on the work pieces in a direction substantially perpendicular to the plane 109 of feeding movement of the tools T relative to the work W.

It is also to be noted that with this arrangement both master crankshafts are removed from any chips and cutting compound from the cutting tools T while at the same time providing a solid mass of metal across the lathe. Suitable end thrust plates 110 carried by the end housings 12 and 13 serve to maintain the proper running fit between the tool carriers and the steady rest unit 8 in a manner preferably as shown in the Patent 1,744,885.

The combined roughing and finishing tool holders 111 are shown in detail in Figures VII and VIII. For the sake of clearness these tool holders are not in detail on the front of the orbitally moving tool carriers 104, 105, 106, and 107 in Figure I. The tool holder comprises a U-shaped member 111 and 111a which is pivotally mounted on a stud 112 carried in the tool holder base 113 normally fixed to the tool carriers 104, 105, 106 and 107 by the studs 114, the nuts 115, and collars 116. These bases 113 are mounted on the tool carriers for both vertical and horizontal adjustment to facilitate final accurate setting of the cutting tools T relative to the work pieces W.

Each tool holder base 113 is mounted on an adjusting plate 117 which is the same width as the base and which may be adjusted vertically along the length of the base by rotating the adjusting screw 118 rotatably mounted in the integral boss 119 of the plate 117 against axial movement and threaded at 120 in the base 113. Integral tongues 121 of the plate 117 slidingly engage in the slots 122 formed in the base 113 to properly maintain alignment of the base and plate 117.

When the nuts 115 are loosened the base 113 and plate 117 may be bodily moved up and down on the tool carrier by appropriately manipulating the adjusting screws 123 and 124, the purpose of which adjustment is to set the cutting tools T to cut the proper diameters on the work piece. The screw 123 is threaded in the tapped hole 125 in the base 113 and abuts against the stud 114 for raising the base 113 and the plate 117 while the screw 124 is threaded in a tapped hole 126 in the stud 114 and engages the top face 127 of the base 113 for lowering said parts.

Sidewise adjustment of the tool holder base 113 on the tool carrier units is accomplished by rotating the adjusting screw 118, when nuts 115 are loosened and the adjusting screws 123 and 124 are properly set, which moves the plate 117 relative to the tool holder base 113 and the tool carrier unit 107. In the plate 117 are formed bores 128 in which are rotatably mounted discs 129 each of which has corresponding integral eccentrically located pins 130 and 131. The pins 130 carry shoes 132 which operate in horizontal slots 133 formed in the tool holder base 113 while the pins 131 carry shoes 134 which operate in the vertical slots 135 formed in the tool carrier units. It is to be noted, Figure VIII, that the axes of the pins 130 are located substantially in horizontal planes passing through the axes of rotation of the discs 129 and that the axes of the pins 131 are located substantially in a vertical plane passing through the axes of rotation of said discs 129. Thus as the plate 117 is moved up or down by the screw 118 while the base 113 is held against vertical movement relative to the tool carrier by the screws 123 and 124, the discs 129 will be caused to rotate since their pins 130 and shoes 132 are confined against vertical movement by the horizontal slots 133 in the base 113. The rotation of these discs 129 causes the pins 131 to rotate about the axes of said discs. Since these pins 131 are confined by the shoes 134 against horizontal movement in the vertical slots 135 of the tool carrier the discs 119 are urged horizontally thus similarly moving the plate 117 and the base 113 sideways to effect proper spacing of the cutting tools for facing the cheeks and fillets of the crank pins of the crankshaft W. Thus by the above arrangement very accessible and easily operated means are provided to facilitate setting of both diameter and sidewise spacing of these unique tool holders.

On the portion 111a of the U-shaped tool holder are mounted the roughing tools 136 and 137, Figure X, which are adapted through the cheeks 138, the fillets 139R, and the crank pin diameters 140R. On the portion 111 of the tool holder is mounted the finishing tools 141 and 142, Figure XI, which are adapted to finish the fillets 139F and the crank pin diameters 140F.

The portion 111a is adjustable on a suitable tongue and groove guideway 143 for purposes of providing relative adjustment between the finishing tools and the roughing tools. Suitable studs 144 and nuts 145 serve to securely bind the portion 111a to the portion 111 when such adjustment has been made.

A unique arrangement is to provide a common roller effective during the operation of either the roughing tools or finishing tools. This roller 146 is rotatably mounted on a suitable stud 147 fixed in the portion 111 of the tool holder and is arranged to at all times contact the crank pin P of the crankshaft to be machined when the cutting tools have been brought into the plane of feeding 109.

In order to normally urge the roller 146 against the crank pin with a relative light initial pressure an arrangement, as best shown in Figures V and IX, is utilized which comprises a flange contact roller 148 engaging the periphery of the roller 146 at a point substantially diametrically opposite from that of the crank pin being machined. This roller 148 is rotatably mounted on a pin 149 carried in the bifurcated end 150 of the spring urged plunger 151 slidably mounted in the bore 152 in the tool carrier 107 and is normally moved toward the roller 146 by the spring 153. The flanges on the roller 148 prevent the plunger 151 from rotating in the bore 152 and thus causing improper engagement of the rollers 146 and 148.

In order to limit the amount of outward swinging movement which may be effected in the tool holder by the spring 153, a stop screw 154 threaded in the base 113 is provided which is adapted to engage an abutment 155 formed on the tool holder portion 111 to limit the outward swinging when the tools T are withdrawn from the line of feeding 109 or when no work pieces are placed in the lathe.

The operation of the lathe is illustrated in Figures XII, XIII, XIV, and XV. When loading or unloading work pieces in the lathe fluid pressure is applied to the cylinder 15 so as to withdraw the traversing cradle toward the rear of the lathe to withdraw the cutting tools T from the plane of feeding 109 to thereby render the work pieces very accessible for loading and unloading from the chucking devices 58. This condition is shown in Figure XII. Under these conditions the excessive outward swinging to withdraw the traversing cradle and the tools T from the finished work piece preparatory to unloading them from the lathe.

Having fully set forth and described my invention, what I claim and desire to secure by United States Letters Patent is:

1. In a lathe for orbital turning, a tool holder, a roughing tool and a finishing tool in the tool holder, means independent of the work piece being turned for causing said tool holder as a whole to move in an orbital path following the work, means dependent upon the work piece to move the cutting edge of said tools tangentially of the work surface being machined while said tool holder as a whole follows said orbital path, and means for feeding one or the other of said tools substantially perpendicular to said tangential movement relative to said work surface.

2. In a lathe for orbital turning, a tool holder, cutting tools in the tool holder located each side of a work piece to be machined in said lathe, means independent of the work piece being turned for causing said tool holder as a whole to move in an orbital path following the work, means dependent upon the work piece to move the cutting edge of said tools tangentially of the work surface being machined while said tool holder as a whole follows said orbital path, and means for feeding said tools substantially perpendicular to said tangential movement relative to said work surface.

3. In a lathe for orbital turning, a tool holder, cutting tools in the tool holder located each side of a work piece to be machined in said lathe, means independent of the work piece being turned for causing said tool holder as a whole to move in an orbital path following the work, means engaging said work piece between said tools to effect tangential movement of the tools relative to the work surface being machined while said tool holder as a whole follows said orbital path, and means for feeding said tools substantially perpendicular to said tangential movement relative to said work surface.

4. In a lathe for orbital turning, a tool holder, a roughing tool and a finishing tool in the tool holder, means independent of the work piece being turned for causing said tool holder as a whole to move in an orbital path following the work, means dependent upon the work piece to move the cutting edge of said tools tangentially of the work surface being machined while said tool holder as a whole follows said orbital path, means for feeding one or the other of said tools substantially perpendicular to said tangential movement relative to said work surface, and means for bodily moving said tools to and from cutting position.

5. In a lathe for orbital turning, a tool holder, a tool in the tool holder, means independent of the work piece being turned for causing said tool holder as a whole to move in an orbital path following the work, means dependent upon the work piece to move the cutting edge of said tool in tangential floating movement relative to the work surface being machined while said tool holder as a whole follows said orbital path, and means for bodily moving said tool holder to and from cutting position.

6. In a lathe for orbital turning, a tool holder, a tool in the tool holder, means independent of the work piece being turned for causing said tool holder as a whole to move in an orbital path following the work, means dependent upon the work piece to move the cutting edge of said tool in tangential floating movement relative to the work surface being machined while said tool holder as a whole follows said orbital path, and means for bodily moving said tool holder substantially parallel with the direction of said tangential movement of said tool.

7. In a lathe for orbital turning, a tool holder, tools in said tool holder located each side of a work piece to be machined in said lathe, means independent of the work piece being turned for causing said tool holder as a whole to move in an orbital path following the work, means dependent upon the work piece to move the cutting edge of said tools tangentially of the work surface being machined substantially perpendicular to a plane passing through the cutting edges of the tools and the axis of rotation of the work, and means for effecting feeding movements in said tool holder in a direction substantially parallel to said plane.

8. In a lathe for orbital turning, a tool holder, tools in said tool holder located each side of a work piece to be machined in said lathe, means independent of the work piece being turned for causing said tool holder as a whole to move in an orbital path following the work, means dependent upon the work piece to move the cutting edge of said tools tangentially of the work surface being machined substantially perpendicular to a plane passing through the cutting edges of the tools and the axis of rotation of the work, means for effecting feeding movements in said tool holder in a direction substantially parallel to said plane, and means for bodily moving said tool holder perpendicular to said plane.

9. In a crankshaft lathe, rotary work spindles, an orbitally moving tool carrier, cutting tools mounted on said carrier each side of work pieces in said spindles to be machined in said lathe, means for moving said carrier radially of the axis of said work spindles to effect feeding of said tools relative to said work piece, and means on said carrier for effecting tangential floating movements in said tools relative to the work surfaces being turned.

10. In a crankshaft lathe, a tool carrier means for moving said tool carrier in orbital movement, a cutting tool mounted on said carrier each side of a work piece to be machined in said lathe, means for moving said carrier radially of the axis of said work spindles to effect feeding of one or the other of said tools relative to said work piece, and means for reversing rotation of said work spindles when one or the other of said tools is operating on said work piece.

11. In a crankshaft lathe, an orbitally moving tool carrier, a rotary work spindle, a cutting tool on said carrier located each side of a work piece in said spindle, means for feeding one or the other of said tools relative to the work piece, and means for moving said tools to and from cutting position in a direction substantially perpendicular to said feeding movement.

12. In a crankshaft lathe, a frame, rotary work spindles mounted in said frame, a traversing member mounted for horizontal movement in said frame, a feeding member mounted for vertical movement on said traversing member, an orbitally moving tool carrier mounted on said feeding member, cutting tools mounted on said carrier, means for actuating said work spindles and orbitally moving tool carrier in synchronism, means for actuating said traversing member to bring said tools to or from cutting position, means for actuating said feeding member to cause said tools to operate on the work in said spindles.

13. A tool holder for a lathe comprising, a base adapted to be fed radially of the axis of a work piece in the lathe, a cutting tool located each side of said work piece mounted on said base for tangential floating movement relative to the surface being machined on said work piece, and means associated with said cutting tools and engaging said work piece for limiting said tangential floating movement.

14. A tool holder for a lathe comprising a base adapted to be fed radially of the axis of a work piece in the lathe, a cutting tool located each side of said work piece mounted on said base for tangential floating movement relative to the surface being machined on said work piece, means associated with said cutting tools and engaging said work piece for limiting said tangential movement, and means for effecting initial engagement of said last mentioned means with said work piece.

15. A tool holder for a lathe comprising, a base adapted to be fed relative to a work piece in the lathe, a cutting tool located each side of said work piece mounted on said base for movement tangentially of the surface being machined on said work piece, means associated with said cutting tools and engaging said work piece for limiting said tangential movement of the tools during the machining of said work piece, and means associated with said base to limit said tangential movement when said work is removed from said tool holder.

16. In a tool holder for lathe, a base adapted to be fed relative to a work piece in the lathe, a cutting tool located each side of said work piece in a plane passing through the axis of rotation of the work and parallel to the direction of feeding of said base, and means permitting limited movement of said tools in a direction substantially perpendicular to said plane.

17. In a tool holder for lathe, a base adapted to be fed relative to a work piece in the lathe, a cutting tool located each side of said work piece in a plane passing through the axis of rotation of the work and parallel to the direction of feeding of said base, and means controlled by the work piece being machined to effect movement of said tools in a direction substantially perpendicular to said plane.

18. A tool holder for lathe comprising a base, a U-shaped tool holder pivotally mounted on said base at one side of said U-shape, cutting tools mounted on each end of said U-shape, and means carried in the bottom of said U-shape engaging a work piece to be machined by said tools to limit pivotal movement of said tool holder.

19. A tool holder for lathe comprising a base, a tool holder movably mounted on said base, spaced tools mounted on said tool holder, and a work engaging roller mounted on said tool holder between said tools to limit the relative movement of said tool holder and said base.

20. A tool holder for lathe comprising a base, a tool holder pivotally mounted on said base, spaced cutting tools mounted on said tool holder, a work engaging roller mounted on said tool holder, and means in said base engaging said roller to effect initial contact of said roller with a work piece to be machined by said cutting tools.

21. In a crankshaft lathe, a plurality of work spindles arranged in a plane of tool feeding, a master crankshaft located and movable in feeding motion in said plane, an orbitally moving tool carrier mounted on a crank pin of said master crankshaft, a second master crankshaft connected to said tool carrier to prevent all pivotal movement of said carrier on the crank pin of said first mentioned crank, means for simultaneously actuating both of said master crankshafts in feeding motion, and means for rotating said work spindles and master crankshafts in synchronism.

22. In a crankshaft lathe, a plurality of work spindles arranged in a plane of tool feeding, a master crankshaft located and movable in feeding motion in said plane, an orbitally moving tool carrier mounted on a crank pin of said master crankshaft, a second master crankshaft connected to said tool carrier to prevent all pivotal movement of said carrier on the crank pin of said first mentioned crank, a tool holder associated with each work spindle and movable relative to said carrier in a direction substantially perpendicular to said plane, means on said tool holder engaging the work piece being machined to determine the amount of said relative tool holder movement, means for simultaneously actuating both of said master crankshafts in feeding motion, and means for rotating said work spindles and master crankshafts in synchonism.

23. In a crankshaft lathe, a plurality of work spindles arranged in a plane of tool feeding, a master crankshaft located and movable in feeding motion in said plane, an orbitally moving tool carrier mounted on a crank pin of said master crankshaft, a second master crankshaft connected to said tool carrier to prevent all pivotal movement of said carrier on the crank pin of said first mentioned crank, a tool holder associated with each work spindle, and movable relative to said carrier in a direction substantially perpendicular to said plane, spaced tool means on each tool holder having their cutting edges in said plane, means on said tool holder engaging the work piece being machined to determine the amount of said relative tool holder movement, means for simultaneously actuating both of said master crankshafts so as to alternately effect feeding of one or the other of said spaced tools to work in said lathe, and means for rotating said work spindles and master crankshafts in synchronism.

24. In an orbital lathe, a frame, a plurality of work spindles mounted in said frame, steady rests mounted in said frame and associated with said work spindles, a traversing cradle movably mounted on said frame, orbitally moving tool carriers mounted in said cradle, tools on said carriers associated with said spindles, means on said cradle for actuating said carriers in feeding movement relative to said work spindles and steady rests, and means for simultaneously actuating said work spindles and orbital tool carriers in synchronism.

25. An adjustable mounting for a tool holder for lathe comprising, a carrier member, a tool holder, an adjusting plate mounted between said carrier and tool holder, means for adjusting said plate relative to said tool holder, means for adjusting said tool holder and plate relative to said carrier, and means for locking both said tool holder and plate to said carrier.

26. An adjustable mounting for a tool holder for lathe comprising, a carrier member, a tool holder, an adjusting plate mounted between said carrier and tool holder, means for adjusting said tool holder in one direction relative to said carrier, means for preventing movement of the tool holder in said direction, and means for adjusting said plate relative to said carrier and tool holder when said last mentioned means is rendered effective in order to effect adjustment of said tool holder perpendicular to said mentioned direction.

27. An adjustable mounting for a tool holder for lathe comprising, a carrier member, a tool holder, an adjusting plate mounted between said carrier and tool holder, means for adjusting said tool holder in one direction relative to said carrier, means for preventing movement of the tool holder in said direction, and means for adjusting said plate relative to said carrier and tool holder when said last mentioned means is rendered effective in order to effect adjustment of said tool holder perpendicular to said mentioned direction, and means for locking said tool holder and plate to said tool carrier.

28. A tool holder for lathe comprising a base, a tool holder movably mounted on said base perpendicular to the axis of rotation of the work spindle of said lathe, spaced tools mounted on said tool holder on substantially diametrically opposite sides of said axis, and a work engaging roller mounted on said tool holder between said tools and to one side of a plane passing through the cutting edge of said tools to limit the relative movement of said tool holder and said base.

29. A tool holder for lathe comprising a base, a tool holder, spaced tools mounted on said tool holder on opposite sides of the axis of rotation of the work spindle of said lathe, mounting means on said base for said tool holder to permit perpendicular movement of said tool holder relative to said axis whereby the cutting edges of said tools can effect tangential floating movements relative to the work surface of a work piece in said lathe, and a work engaging roller mounted on said tool holder between said tools and to one side of a plane passing through the cutting edges of said tools to limit said tangential floating movement.

30. A tool holder for lathe comprising a base, a tool holder, spaced tools mounted on said tool holder on opposite sides of the axis of rotation of the work spindle of said lathe, mounting means on said base for said tool holder to permit perpendicular movement of said tool holder relative to said axis whereby the cutting edges of said tools can effect tangential floating movements relative to the work surface of a work piece in said lathe, a work engaging roller mounted on said tool holder between said tools and to one side of a plane passing through the cutting edges of said tools to limit said tangential floating movement, and means to move said base in feeding movement parallel with said plane to effect cutting action of said tools on said work piece.

31. A tool holder for lathe comprising a base, a tool holder, spaced tools mounted on said tool holder on opposite sides of the axis of rotation of the work spindle of said lathe, mounting means on said base for said tool holder to permit perpendicular movement of said tool holder relative to said axis whereby the cutting edges of said tools can effect tangential floating movements relative to the work surface of a work piece in said lathe, a work engaging roller mounted on said tool holder between said tools and to one side of a plane passing through the cutting edges of said tools to limit said tangential floating movement, said mounting means for said tool holder comprising a pivot carried in said base and located in said plane and to one side of said axis, and means to move said base in feeding movement parallel with said plane to effect cutting action of said tools on said work piece.

WILLIAM F. GROENE.